United States Patent [19]

Kubo et al.

[11] Patent Number: 4,594,914
[45] Date of Patent: Jun. 17, 1986

[54] TRANSVERSE TYPE AUTOMATIC TRANSMISSION WITH INTERMEDIATE POWER TRANSFER THROUGH LAY SHAFT

[75] Inventors: Seitoku Kubo, Toyota; Kunio Morisawa, Okazaki; Masakatsu Miura, Kariya, all of Japan

[73] Assignees: Toyota Jidosha Kabushiki Kaisha; Aisin-Warner Limited, both of Japan

[21] Appl. No.: 425,257

[22] Filed: Sep. 28, 1982

[30] Foreign Application Priority Data

Nov. 11, 1981 [JP] Japan .................. 56-180793

[51] Int. Cl.⁴ ............... F16H 47/00; F16H 37/08; F16H 37/06; F16H 37/00
[52] U.S. Cl. .................. 74/730; 74/695; 74/682; 74/740
[58] Field of Search .......... 74/695, 682, 701, 730, 74/740, 359

[56] References Cited

U.S. PATENT DOCUMENTS

| | | | |
|---|---|---|---|
| 2,892,361 | 6/1959 | Miller | 74/682 |
| 2,897,690 | 8/1959 | Maier | 74/730 |
| 3,424,033 | 1/1969 | Croswhite | 74/730 |
| 3,578,760 | 5/1971 | Shinmura | 74/701 |
| 4,056,988 | 11/1977 | Kubo et al. | 74/695 |
| 4,095,487 | 6/1978 | Cartwright | 74/695 |
| 4,205,563 | 6/1980 | Gorrell | 74/730 |
| 4,258,586 | 3/1981 | Numazawa | 74/695 |
| 4,263,823 | 4/1981 | Numazawa | 74/695 |
| 4,280,374 | 7/1981 | Kubo et al. | 74/730 |
| 4,315,443 | 2/1982 | Kubo et al. | 74/695 |
| 4,537,092 | 8/1985 | Morisawa | 74/740 X |

FOREIGN PATENT DOCUMENTS

| | | | |
|---|---|---|---|
| 593071 | 2/1960 | Canada | 74/682 |
| 53-18112 | 8/1979 | Japan | 74/695 |
| 56-39346 | 4/1981 | Japan | 74/740 |
| 2017837 | 10/1979 | United Kingdom | 74/695 |
| 1581272 | 12/1980 | United Kingdom | 74/359 |
| 2063394 | 6/1981 | United Kingdom | 74/695 |

Primary Examiner—Kenneth J. Dorner
Assistant Examiner—Shirish Desai
Attorney, Agent, or Firm—Stevens, Davis, Miller & Mosher

[57] ABSTRACT

An automatic transmission includes a fluid torque converter and a first and a second gear transmission mechanism, each of which has two coaxial drive members—a power input member and a power output member—and is selectable to any one of several speed ratios. Rotational power is output from the fluid torque converter to the first gear transmission mechanism. The torque converter, and the first gear transmission mechanism including the power input and power output members thereof, are all coaxial on a first axis. A through lay shaft extends along a second axis parallel to the first axis, passing through the second gear transmission mechanism so as to support it, and is rotationally coupled to the power input member of the second gear transmission mechanism. A gear wheel rotationally coupled to the power output member of the first gear transmission mechanism transfers rotational power to a gear wheel meshed with it and fixed to the through lay shaft, which transfers this rotational power to the power input member of the second gear transmission mechanism. A power output gear wheel is rotatably supported by the through lay shaft and is rotationally coupled to the power output member of the second gear transmission mechanism.

5 Claims, 2 Drawing Figures

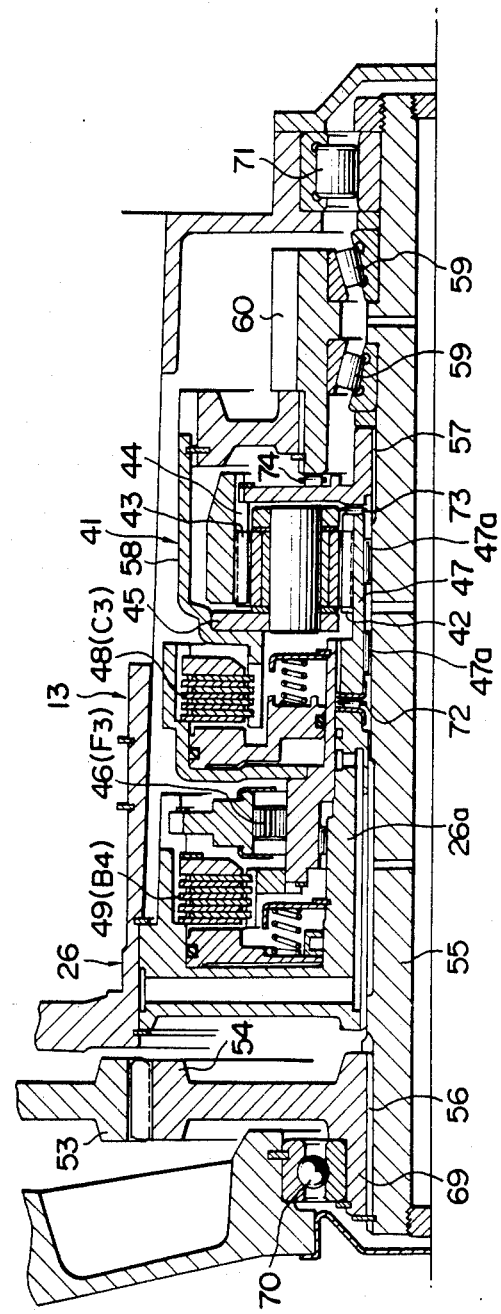

TRANSVERSE TYPE AUTOMATIC TRANSMISSION WITH INTERMEDIATE POWER TRANSFER THROUGH LAY SHAFT

BACKGROUND OF THE INVENTION

The present invention relates to a transmission for an automotive vehicle, and in particular relates to an automatic type transmission particularly suitable for use in a transverse front engine front wheel drive type automotive vehicle, or a so called FF vehicle.

There is a known type of front engine type front wheel drive type automotive vehicle in which the internal combustion engine thereof is mounted transversely to the vehicle body, with its crankshaft extending at right angles to the longitudinal axis of the automotive vehicle body, and in which the automatic transmission thereof is attached to the internal combustion engine with the directions of the rotational axes of the various mechanisms contained therein likewise extending transversely to the longitudinal axis of the vehicle body. In such a transverse type of construction, it is very important to keep the axial length of the automatic transmission as short as possible, so as to fit the transmission mechanism and the rotary power train of the vehicle as a whole into the shortest possible space, in view of the severe restriction imposed on the axial length of this rotary power train by the overall width of the vehicle, within which of course the rotary power train must be accomodated.

There is a per se well known form of transmission which has been evolved as suitable for such transverse mounting, in which a fluid torque converter is mounted to the internal combustion engine and is placed coaxially with said engine and with a gear transmission mechanism along a first axis and drives and gear transmission mechanism, and in which the rotary power output from said gear transmission mechanism is transferred sideways from said first axis to a lay shaft which extends along a second axis parallel to said first axis back under the gear transmission mechanism to a point approximately under the torque converter, where this engine side end of the lay shaft is rotationally connected to a differential device appropriate for a front wheel drive configuration.

This configuration of automatic transmission has been successfully implemented in the past, but owing to the limited space available along said first axis for providing said gear transmission mechanism the design process, manufacture, assembly, and servicing therefor have been rather difficult. Further, in line with the ever increasing requirements for smaller and smaller automotive vehicles, there has been recently a need to adapt these automatic transmissions to vehicles having even smaller widths than heretofore, which has been very difficult, in view of the problems in design, manufacture, assembly, and servicing outlined above.

Also, in the construction of such an automatic transmission, the compactness in the directions sideways from the axial direction described above which is transverse to the vehicle axis is important; in other words, it is important that the transmission not be too fat; and more particularly it is important that there not be too much of a bulge created by providing space within the transmission for accomodating the gear train which is necessarily provided for driving the above described lay shaft from the power output member of the gear transmission mechanism. The reduction of such a bulge, especially of the bulge at the lower side of the transmission around the end of the lay shaft, is important in view of the problem of interference between such a bulge and the drive shaft which drives the front wheel on that side of the automotive vehicle, which sometimes presents a problem.

Further, in the past, difficulties have been experienced with regard to making the transmission, and particularly the internal construction thereof, strong enough to be durable over a long period of time; in particular the lay shaft structure has experienced problems with regard to strength, which have affected its durability. The weight of the transmission as a whole, and the weight of the lay shaft structure in particular, also in some cases are critical design factors with regard to such a transmission. Finally, the question of noise produced by the gears in such a transmission, and in particular the question of the noise produced by the lay shaft asssembly, is important from the point of view of producing a transmission which is environmentally acceptable, as well as being easy and pleasant of operation by the driver of the vehicle, especially over a long period. This has importance with regard to questions of drivability of the vehicle as a whole. These questions of noise, and of durability, are related to the desire to simplify the bearing structure of such a lay shaft construction.

In order to meet with the abovementioned requirements, one of the present inventors has proposed an automatic transmission suitable for mounting in an automobile, for which inventive concept U.S. patent application Ser. No. 06/418,026 filed Sept. 14, 1982 has been filed, based upon Japanese Patent Application No. 147,436/81 filed on Sept. 17, 1981.

In this above indentified earlier proposal, a construction for an automatic transmission is suggested in which a fluid torque converter and a first gear transmission mechanism connected thereto are mounted along a first axial line, with a lay shaft extending along a second axial line which is parallel to said first axial line, and a second gear transmission mechanism is mounted on said lay shaft, with said lay shaft passing through said second gear transmission mechanism and being therefore a through lay shaft which rotationally supports said second gear transmission mechanism. A rotational power input member of the second gear transmission mechanism drivingly connected to a rotational power output member of the first gear transmission mechanism and a power output gear wheel of the automatic transmission are also supported by the through lay shaft so as to be rotatable about the second axial line. Thereby, the axial length of the entire construction is reduced, since the gear transmission mechanism is split into two parts which are arranged side by side with regard to the axial direction, and also the second gear transmission mechanism and the power output gear wheel which will drive a differential gear mechanism of the automobile to which the transmission is fitted are mounted securely and rigidly by the simple construction that they are supported on the through lay shaft. In further developments of the automatic transmission based upon the abovementioned basic concept, the present inventors have conceived the concept that the through lay shaft, which rotationally supports the second gear transmission mechanism, including the rotational power input member thereof as well as the power output gear wheel of the automatic transmission, i.e. the entire rotational members which rotate about said second axial line, should be also utilized as effectively as possible for transmitting rotational power along said second axial line.

Still further, in further developments of the automatic transmission based upon the aforementioned basic concept, it has also been conceived of by the present inventors that the through lay shaft extending along said second axial line through the entire rotational structure supported thereby should be effectively utilized to balance various axial thrust forces generated in various portions of the gear meshing mechanisms arranged along said second axial line. In fact, various axial thrusts are caused by axial pushing of the various gear wheels by the other gear wheels with which they are meshed, owing to the fact that these gear wheels are always formed as helically cut gear wheels, in view of the well known advantages of such a form of construction, such as smooth torque transmission, etc..

SUMMARY OF THE INVENTION

Accordingly, it is the primary object of the present invention to provide an automatic transmission whose axial length is minimized by dividing its gear transmission mechanism into two parts arranged in parallel with one another and incorporating a through lay shaft which passes through and rotationally supports a second part of the gear transmission mechanism, and which is thus particularly suitable for incorporation into a transverse front engine type front wheel drive type automotive vehicle, in which the through lay shaft is more effectively used for transmitting the torque therethrough.

It is a further object of the present invention to provide an automatic transmission for an automotive vehicle, as mentioned above, in which the through lay shaft is further more effectively utilized so as to balance the thrust forces generated in said second part of the gear transmission mechanism and related rotating structures owing to the meshing of helically cut gear wheels incorporated therein.

It is a further object of the present invention to provide an automatic transmission for an automotive vehicle, as mentioned above, which has good design characteristics.

It is a further object of the present invention to provide an automatic transmission for an automotive vehicle, as mentioned above, which is easy to manufacture.

It is a further object of the present invention to provide an automatic transmission for an automotive vehicle, as mentioned above, which is cheap to manufacture.

It is a further object of the present invention to provide an automatic transmission for an automotive vehicle, as mentioned above, which is easy to assemble.

It is a further object of the present invention to provide an automatic transmission for an automotive vehicle, as mentioned above, which is easy to service after installation in said automotive vehicle.

It is a further object of the present invention to provide an automatic transmission for an automotive vehicle, as mentioned above, which is compact.

It is yet a further object of the present invention to provide an automatic transmission for an automotive vehicle, as mentioned above, which is strong.

It is yet a further object of the present invention to provide an automatic transmission for an automotive vehicle, as mentioned above, which is durable during use.

It is yet a further object of the present invention to provide an automatic transmission for an automotive vehicle, as mentioned above, in which the overall gearing ratio provided by the drive train as a whole is appropriate.

It is yet a further object of the present invention to provide an automatic transmission for an automotive vehicle, as mentioned above, in which the reduction gearing ratio provided by the differential mechanism associated therewith may be substantially less than has been heretofore required and appropriate.

It is yet a further object of the present invention to provide an automatic transmission for an automotive vehicle, as mentioned above, with the use of which the overall weight of the entire drive train may be reduced.

It is yet a further object of the present invention to provide an automatic transmission for an automotive vehicle, as mentioned above, with the use of which the weight of the associated differential mechanism may be reduced.

It is yet a further object of the present invention to provide an automatic transmission for an automotive vehicle, as mentioned above, with the use of which the overall size of the entire drive train may be reduced.

It is yet a further object of the present invention to provide an automatic transmission for an automotive vehicle, as mentioned above, with the use of which the size of the associated differential mechanism may be reduced.

It is yet a further object of the present invention to provide an automatic transmission for an automotive vehicle in which the occurrence of gear noise is reduced.

It is yet a further object of the present invention to provide an automatic transmission for an automotive vehicle in which the bulge caused on the outside of the transmission casing by the provision of the space necessary to house the gear train which drives the lay shaft is reduced as much as possible.

It is yet a further object of the present invention to provide an automatic transmission for an automotive vehicle in which particularly the lower part of said bulge caused on the outside of the transmission casing by the provision of the space necessary to house the gear train which drives the lay shaft is reduced as much as possible.

It is yet a further object of the present invention to provide an automatic transmission for an automotive vehicle in which interference caused between the lower part of said bulge caused on the outside of the transmission casing by the provision of the space necessary to house the gear train which drives the lay shaft and the drive shaft for the wheel on that side of the automotive vehicle is reduced as much as possible.

It is yet a further object of the present invention to provide an automatic transmission for an automotive vehicle in which the bearing support construction for the lay shaft is simplified as much as possible.

It is yet a further object of the present invention to provide an automatic transmission for an automotive vehicle in which the bearing support construction for the lay shaft is made as strong as possible.

It is yet a further object of the present invention to provide an automatic transmission for an automotive vehicle in which axial thrust on the lay shaft is reduced as much as possible.

It is yet a further object of the present invention to provide an automatic transmission for an automotive vehicle in which the various gears may be helically cut, without causing undue axial thrust on the lay shaft.

It is yet a further object of the present invention to provide an automatic transmission for an automotive vehicle in which the bearing support construction for the lay shaft is not required to incorporate any thrust bearing assembly.

It is yet a further object of the present invention to provide an automatic transmission for an automotive vehicle in which power loss in the bearing support construction for the lay shaft is minimized.

It is yet a further object of the present invention to provide an automatic transmission for an automotive vehicle, as described above, which provides as high an overall power transmission efficiency as possible.

It is yet a further object of the present invention to provide an automatic transmission for an automotive vehicle, as described above, which provides as environmentally good operation as possible.

It is yet a further object of the present invention to provide an automatic transmission for an automotive vehicle, as described above, which provides as good drivability for the automotive vehicle to which it is fitted as possible.

According to the present invention, these and other objects are accomplished by an automatic transmission for an automotive vehicle, comprising: (a) a fluid torque converter, comprising a rotational power input member and said rotational power output member both being rotatable about a first axial line; (b) a first gear transmission mechanism, comprising a rotational power input member and a rotational power output member, which can be selectively controlled to produce any one of a plurality of speed ratios between said rotational power input member and said rotational power output member, said rotational power input member and said rotational power output member both being rotatable about said first axial line; said rotational power input member of said first gear transmission mechanism being rotationally connected to said rotational power output member of said fluid torque converter; (c) a second gear transmission mechanism, comprising a rotational power input member and a rotational power output member, which can be selectively controlled to produce any one of a plurality of speed ratios between said rotational power input member and said rotational power output member, said rotational power input member and said rotational power output member both being rotatable about a second axial line parallel to said first axial line and displaced laterally therefrom; (d) a through lay shaft which extends along and is rotatable about said second axial line, which is rotationally coupled to said rotational power input member of said second gear transmission mechanism, and which passes through said second gear transmission mechanism; (e) a rotational power transfer mechanism, which transfers rotational power from said rotational power output member of said first gear transmission mechanism to said through lay shaft; and (f) a power output gear wheel which is supported by said lay shaft so as to be rotatable thereon about said second axial line and which is drivingly rotationally connected with said rotational power output member of said second gear transmission mechanism.

According to such a structure, since the automatic transmission incorporates both the first gear transmission mechanism and the second gear transmission mechanism, the first gear transmission mechanism being provided as lying along the first axis while the second gear transmission mechanism is provided as lying along the second axis which is parallel with and displaced from the first axis, in the same manner as in said former proposal by one of the present inventors, the overall construction of the automatic transmission is rendered remarkably compact, and its axial length is very greatly reduced as compared with conventional designs of the sort outlined above. Further, the through lay shaft operates more effectively as a substantial torque transmitting member, in addition to its primary task of rotationally supporting the entire mechanisms adapted to operate about said second axial line. Yet further, as in the aforementioned former proposal, because the lay shaft passes through the second gear transmission mechanism, the bearing structure for this lay shaft as well as the bearing structure for the second gear transmission mechanism are as a matter of course rendered much simpler than would be the case if said lay shaft only extended on one side of said second gear transmission mechanism or were divided into two arranged on opposite sides of the second gear transmission mechanism. The increased rigidity of the support of the lay shaft can also make the transmission strong and durable during use; and, as a matter of course, reduces the gear noise caused by the oscillation of the second gear transmission mechanism, thus rendering the transmission more environmentally acceptable, and increasing the drivability of the automotive vehicle to which said transmission is fitted. These favorable features with regard to the bearing support of the lay shaft are further enhanced in the present invention because the through lay shaft may be firmly coupled to a driven member of the rotational power transmission mechanism which transfers rotational power between said first and second gear transmission mechanisms on the one hand while on the other hand it may be firmly coupled to the rotational power input member of the second gear transmission mechanism. This feature further increases the strength and rigidity of the lay shaft construction and of the transmission as a whole.

Further, according to a particular aspect of the present invention, these and other objects are more particularly and concretely accomplished by a transmission as described above, wherein said second gear transmission mechanism comprises a planetary gear mechanism including a sun gear, a ring gear, a plurality of planetary pinions, a carrier, a clutch for selectively rotationally coupling said carrier to said sun gear, and a brake for selectively preventing said sun gear from rotating, said ring gear being rotationally connected with said through lay shaft, while said carrier is rotationally connected with said power output gear wheel, the connection between said ring gear and said through lay shaft and the connection between said carrier and said power output gear shaft being positioned on the same axial side of said second gear transmission mechanism opposite to the other axial side thereof where said second gear wheel is positioned.

According to such a structure, said second gear transmission mechanism, said lay shaft, and said second gear wheel can be assembled together in good structural harmony so as to provide a compact and stable transmission, while utilizing said lay shaft in a very favorable manner as a member for rotationally supporting said second gear transmission mechanism as well as a member for transmitting torque through a substantial axial length along said second axial line.

Further, according to a particular aspect of the present invention, these and other objects are more particularly and concretely accomplished by a transmission as described above, wherein said first gear wheel is constructed as a helically cut gear having a certain handedness, said second gear wheel is constructed as a helically cut gear wheel having the opposite handedness to said certain handedness, and said power output gear wheel is constructed as a helically cut gear wheel having said certain handedness and is axially coupled to said through lay shaft in a force transmitting relationship.

According to such a structure, said through lay shaft is urged in one axial direction by the axial force produced by the meshing between said first gear wheel and said second gear wheel, and is urged in the other axial direction, via said second gear transmission mechanism, by the axial force produced by the meshing of said power output gear wheel with some cooperating rotational power receiving gear wheel such as a ring gear of a differential mechanism. The opposition of these axial forces on the through lay shaft tends to cause them to cancel one another out, which means that less axial force is exerted on the bearing structure of the through lay shaft.

Further, according to a particular aspect of the present invention, these and other objects are more particularly and concretely accomplished by a transmission as described above, wherein said sun gear is constructed as a helically cut gear having said certain handedness, said planetary pinions are constructed as helically cut gear wheels having the opposite handedness to said certain handedness, and said ring gear is constructed as a helically cut gear having the opposite handedness to said certain handedness, and furhter comprising a bearing means for sustaining axial force between said sun gear and said ring gear while allowing relative rotational motion therebetween when said sun gear is urged in the direction towards said power output gear wheel relative to said ring gear and said ring gear is urged in the direction towards said second gear wheel relative to said sun gear, a bearing means for preventing said sun gear from moving in the axial direction towards said second gear wheel while allowing relative rotational motion therebetween when said sun gear is urged in the axial direction towards said second gear wheel, and a means for sustaining axial force between said ring gear and said power output gear wheel while allowing relative rotational motion therebetween when said ring gear is urged in the axial direction towards said power output gear wheel.

According to such a structure, in the engine drive condition, when the second gear transmission mechanism is in its directly connected condition with the sun gear, the planetary pinions, the carrier, and the ring gear all rotating together, then the through lay shaft is only subjected to the axial forces detailed above, i.e. the axial force produced by the meshing between said first gear wheel and said second gear wheel and the opposing axial force produced by the meshing of said power output gear wheel with some cooperating rotational power receiving gear wheel such as a ring gear of a differential mechanism; but on the other hand when the second gear transmission mechanism is in its rotational speed reducing condition with the sun gear rotationally fixed and the planetary pinions, the carrier, and the ring gear all performing planetary motion around said sun gear, then the through lay shaft is subjected to the axial forces detailed above, i.e. the axial force produced by the meshing between said first gear wheel and said second gear wheel and the opposing axial force produced by the meshing of said power output gear wheel with some cooperating rotational power receiving gear wheel such as a ring gear of a differential mechanism, said opposing axial force from the power output gear wheel being greater than in the previous case due to the speed reducing function of the second gear transmission mechanism, and is also subjected to an axial force generated by the skewed meshing between the ring gear and the planetary pinions which aids the force from the second gear wheel, the two of these forces together effectively cancelling out the force due to the power output gear wheel, if the angles of the various helical gears of the system are appropriately chosen. In this last case the axial force generated by the skewed meshing between the ring gear and the planetary pinions is imposed on the sun gear and is finally supported by the bearing means for preventing said sun gear moving towards the second gear wheel. Accordingly the goal of reducing the axial force on the through lay shaft is also effectively accomplished in the speed reduction operation of the second gear transmission mechanism. On the other hand, in the engine braking operational mode or the reverse driving operational mode, the bearing means for sustaining axial force between said sun gear and said ring gear when said sun gear is urged in the direction towards said power output gear wheel relative to said ring gear and said ring gear is urged in the direction towards said second gear wheel relative to said sun gear ensures that neither of these exerts any particular force on the through lay shaft. At the same time, the bearing means for sustaining axial force between said ring gear and said power output gear wheel when said ring gear is urged in the axial direction towards said power output gear wheel ensures that relative rotational motion therebetween when they are in their mutually axially compressed condition is allowed.

Further, according to a particular aspect of the present invention, these and other objects are more particularly and concretely accomplished by a transmission as described above, wherein said through lay shaft is rotationally supported without the use of any thrust bearing structure.

Such a possibility is made practicable by the fact, as explained above, that the axial force on the through lay shaft is effectively absorbed. Of course, thereby the construction of the second gear transmission mechanism, and of the transmission as a whole, is made much cheaper and more easy, and the weight and the bulk thereof are also reduced. Further, the absence of a thrust bearing structure for supporting the through lay shaft means that the power loss in such a thrust bearing structure is avoided, which means that the power transmission efficiency of the transmission as a whole is improved.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

FIG. 2 is a detailed cross sectional view showing the construction of a second gear transmission mechanism incorporated in said preferred embodiment of the automatic transmission according to the present invention shown in FIG. 1, taken in a sectional plane which includes the central rotational axis of said second gear transmission mechanism.

DESCRIPTION OF THE PREFERRED EMBODIMENT

Figure 1:
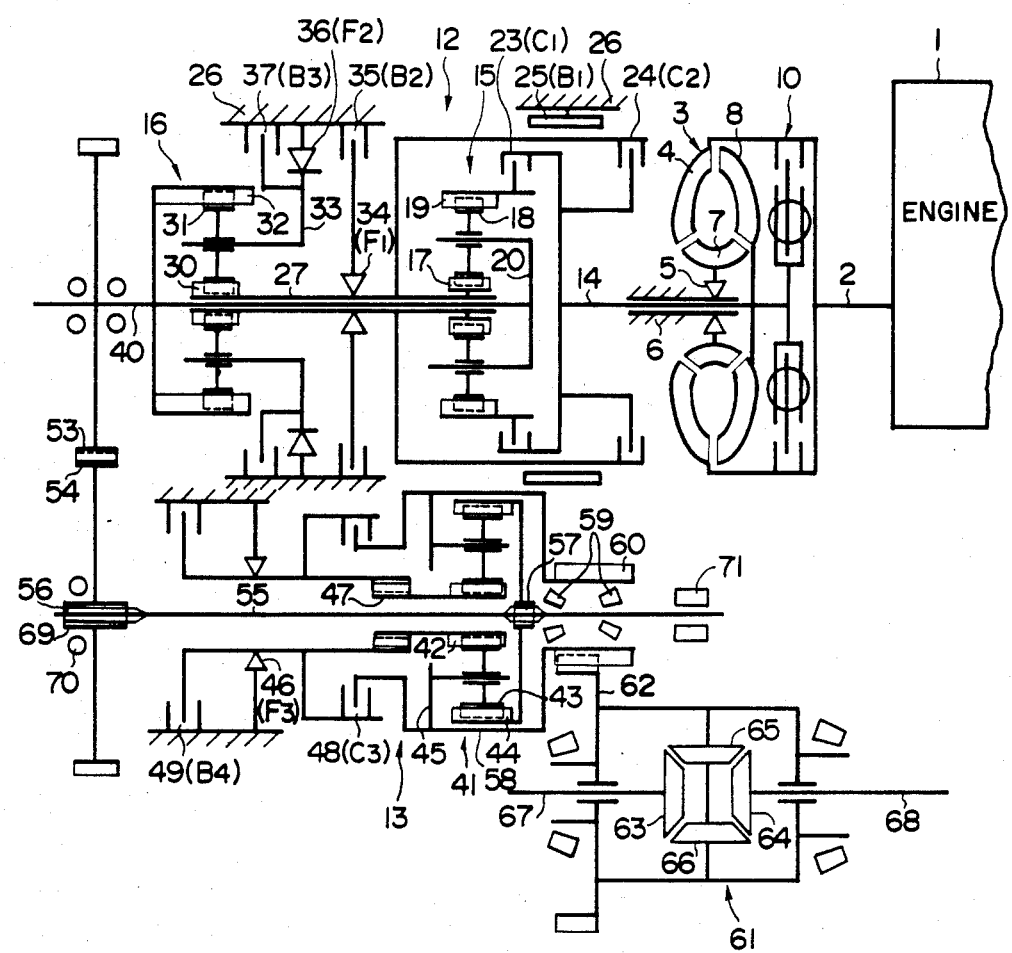
FIG. 1 is a part schematic part block diagrammatical view showing the basic layout of the fundamental mechanical elements of the preferred embodiment of the automatic transmission according to the present invention, and also showing parts of an internal combustion engine and of a differential device which are used therewith.

The present invention will now be described with reference to a preferred embodiment thereof, and with reference to the appended drawings. FIG. 1 shows schematically the mechanical construction of this preferred embodiment. In this figure, the reference numeral 1 denotes an internal combustion engine of an automotive vehicle not shown in the drawings. This internal combustion engine 1 produces output rotational power at the left hand end in the figure of its crankshaft 2 which is its rotational power output member, according to the depression of an accelerator pedal or the like which is adapted to be depressed by the foot or the like of the driver of the vehicle, the amount of said depression controlling the load on the internal combustion engine 1. This left hand end in the figure of said crankshaft 2 is rotationally connected to the pump impeller 4 of a fluid torque converter 3, which is the rotational power input member thereof.

The fluid torque converter 3 is of a per se well known type, and comprises the aforesaid pump impeller 4, a stator member 7 which is mounted via a one way brake 5 to a fixed portion 6 of the housing of the fluid torque converter 3, a turbine member 8, and a direct connection clutch 10. The pump impeller 4, the stator member 7, and the turbine member 8 together form a toroidal fluid circulation path system, around which hydraulic fluid, which fills the interior of the casing (not shown) of the fluid torque converter 3, circulates in the general pattern of a smoke ring, thereby tranferring torque between the pump impeller 4 and the turbine member 8 in a per se well known manner. The turbine member 8 is connected to the right hand end in the figure of a first shaft 14, which serves as a rotational power output shaft for the fluid torque converter 3. The direct connection clutch 10 is controlled by means not shown in the figures or further discussed herein, and when engaged directly mechanically connects together the pump impeller 4 and the turbine member 8, i.e. directly links together with regard to their rotation the rotational power input member and the rotational power output member of the fluid torque converter 3.

The first shaft 14 also serves as a rotational power input shaft for a first gear transmission mechanism 12. The first gear transmission mechanism 12 comprises two planetary gear mechanism, a first planetary gear mechanism 15 to which said first shaft 14 is rotationally coupled as will be seen hereinafter and a second planetary gear mechanism 16, said two planetary gear mechanisms 15 and 16 being arranged as coaxial with one another and with said first shaft 14 (the common axis thereof being hereinafter referred to as the first axis) and spaced apart in the axial direction. And the first gear transmission mechanism 12 also comprises a second shaft 40, which is also coaxial with said first axis and which extends out from the second planetary gear mechanism 16 to the left in the figure, i.e. to the opposite side thereof from the first shaft 14, said second shaft 40 serving as a rotational power output shaft for said first gear transmission mechanism 12. In broad functional terms, the first gear transmission mechanism 12 is an underdrive mechanism, which according to selective supply of actuating hydraulic fluid pressures to various ones of a plurality of friction engaging mechanisms which will be explained in detail in the following provides any one of a plurality of speed ratio between its rotational power input member (the first shaft 14) and its rotational power output member (the second shaft 40), including a directly connected speed ratio and a reverse speed ratio, all of said speed ratios except said directly connected speed ratio being reduction speed ratios in which the rotational power output member of the first gear transmission mechanism 12, i.e. the second shaft 40, rotates more slowly than does the rotational power input member of the first gear transmission mechanism 12, i.e. the first shaft 14.

The first planetary gear mechanism 15 of the first gear transmission mechanism 12 comprises a sun gear 17 and a ring gear 19, both of which are rotationally mounted coaxially with said first axis, and further comprises a planetary pinion 18, which is rotationally mounted to a carrier 20 which is also rotationally mounted coaxially with said first axis, said planetary pinion 18 being meshed between the sun gear 17 and the ring gear 19 and performing planetary motion as the carrier 20 rotates relative to the sun gear 17 between said sun gear 17 and the ring gear 19 in a per se well known way. In fact, of course, in practice several such planetary pinions as the planetary pinion 18 are provided between the sun gear 17 and the ring gear 19 as rotationally mounted to the carrier 20. The sun gear 17 is rotationally coupled to the right hand end in the figure of an intermediate hollow shaft 27, and the carrier 20 is rotationally coupled to the right hand end in the figure of the aforesaid second shaft 40. The ring gear 19 is selectively couplable to the first shaft 14 via a first clutch 23 or $C_1$, which is a hydraulic fluid pressure actuated clutch of a per se well known sort which is engaged by supply of hydraulic fluid pressure to a pressure chamber thereof (not shown) and is otherwise disengaged, and the sun gear 17 is similarly selectively couplable (vi the intermediate hollow shaft 27) to the first shaft 14 via a second clutch 24 or $C_2$, which is also a hydraulic fluid pressure actuated clutch of a per se well known sort which is engaged by supply of hydraulic fluid pressure to a pressure chamber thereof (not shown) and is otherwise disengaged. Further, the sun gear 17 is similarly selectively couplable (via the intermediate hollow shaft 27) to the housing of the transmission, denoted by the reference numeral 26 and only partially shown, via a first brake 25 or $B_1$, which is a hydraulic fluid pressure actuated brake of a per se well known sort which is engaged by supply of hydraulic fluid pressure to a pressure chamber thereof (also not shown) and is otherwise disengaged.

The second planetary gear mechanism 16 of the first gear transmission mechanism 12 comprises a sun gear 30 and a ring gear 32, both of which are rotationally mounted coaxially with said first axis, and further comprises a planetary pinion 31, which is rotationally mounted to a carrier 33 which is also rotationally mounted coaxially with said first axis, said planetary pinion 31 being meshed between the sun gear 30 and the ring gear 32 and performing planetary motion as the carrier 33 rotates relative to the sun gear 30 between said sun gear 30 and the ring gear 32 in a per se well known way. In fact, of course, in practice several such planetary pinions as the planetary pinion 31 are provided between the sun gear 30 and the ring gear 32 as rotationally mounted to the carrier 33. The sun gear 30 is rotationally coupled to the left hand end in the figure of the intermediate hollow shaft 27, and the ring gear 32 is rotationally coupled to and is mounted on an intermediate part of the second shaft 40 and is thus rotationally coupled to the carrier 20 of the first planetary gear mechanism 15. The intermediate hollow shaft 27 and the sun gear 17 of the first planetary gear mechanism 15 and the sun gear 30 of the second planetary gear mechanism 16 are selectively rotationally coupled in one rotational direction only to the housing 26 of the transmission via the series combination of a first one way clutch 34 or $F_1$ and a second brake 35 or $B_2$, which is again a hydraulic fluid pressure actuatd brake of a per se well known sort which is engaged by supply a hydraulic fluid pressure to a pressure chamber thereof (also not shown) and is otherwise disengaged. The carrier 33 is always rotationally coupled in one rotational direction only to the housing 26 of the transmission via a second one way brake 36 or $F_2$, and is also selectively coupled in both rotational directions to said housing 26 of the transmission via a third brake 37 or $B_3$, which is again a hydraulic fluid pressure actuated brake of a per se well known sort which is engaged by supply of hydraulic fluid pressure to a pressure chamber thereof (also not show) and is otherwise disengaged.

On the left hand end in the figure of the second shaft 40 there is fixedly mounted a gear wheel 53, which serves as a power output gear for the first gear transmission mechanism 12. As schematically shown on either side of this gear wheel 53 in the figure, there are provided a pair of bearings for rotatably supporting the second shaft 40 (from the casing 26 of the transmission, although this is not explicitly shown), one on each side of the gear wheel 53. With this gear wheel 53 there is constantly meshed another gear wheel 54, which according to a particular feature of the present invention is a smaller gear wheel, having a smaller number of teeth, than the gear wheel 53. The boss 69 of this gear wheel 54 is fixedly mounted, via splines 56, on the left hand end in the figure of a lay shaft 55, which extends along a second axis which lies below and parallel to the abovementioned first axis along which the first gear transmission mechanism 12 including the first and second planetary gear mechanisms 15 and 16 is arranged, and this lay shaft 55 serves as a rotational power input shaft for a second gear transmission mechanism 13. It should be particularly understood that the gear wheel 54 is mounted on the lay shaft 55 so that axial thrust can be transmitted between them, as well as rotational motion; the significance of this feature will be explained later with reference to FIG. 2.

The second gear transmission mechanism 13 comprises a third planetary gear mechanism 41, and also comprises said lay shaft 55, which is coaxial with said second axis and which passes right through the third planetary gear mechanism 41, is left hand end in the figure extending as explained above through the gear wheel 54 and being rotationally fixed to said gear wheel 54 and its right hand end as seen in the figure extending out to the right of the third planetary gear mechanism 41 in the figure, i.e. to the opposite side thereof from the gear wheel 54, this right hand end of said lay shaft 55 serving as a support for the rotational power output member for the second gear transmission mechanism 13 (the hollow boss of the power output gear wheel 60) as will be seen later. In broad functional terms, the second gear transmission mechanism 13 is also, like the first gear transmission mechanism 12, an underdrive mechanism, which according to selective supply of actuating hydraulic fluid pressures to various ones of a plurality of friction engaging mechanisms which will be explained in detail in the following provides any one of a plurality of speed ratios (which actually are two in number) between its rotational power input member (the lay shaft 55) and its rotational power output member (the hollow boss of the power output gear wheel 60) including a directly connected speed ratio, all of said speed ratios except said directly connected speed ratio being reduction speed ratios in which the rotational power output member of the second gear transmission mechanism 13, i.e. the power output gear wheel 60, rotates more slowly than does the rotational power input member of the second gear transmission mechanism 13, i.e. the lay shaft 55.

The third planetary gear mechanism 41 of the second gear transmission mechanism 13 comprises a sun gear 42 and a ring gear 44, both of which are rotationally mounted coaxially with said second axis, and further comprises a planetary pinion 43, which is rotationally mounted to a carrier 45 which is also rotationally mounted coaxially with said second axis, said planetary pinion 43 being meshed between the sun gear 42 and the ring gear 44 and performing planetary motion as the carrier 45 rotates relative to the sun gear 42 between said sun gear 42 and the ring gear 44 in a per se well known way. In fact, of course, in practice several such planetary pinions as the planetary pinion 43 are provided between the sun gear 42 and the ring gear 44 as rotationally mounted to the carrier 45. The sun gear 42 is rotationally coupled to the right hand end in the figure of a sun gear shaft 47, which is rotatably mounted on the lay shaft 55 via needle roller bearings 47a (only shown in FIG. 2), and the carrier 45 is rotationally coupled, via a torque transmitting member 58, to the boss portion of a power output gear wheel 60 (mentioned above), and via this torque transmitting member 58 the carrier 45 is also coupled to the power output gear wheel 60 with regard to transmission of axial thrust therebetween. As schematically shown on both sides of this power output gear wheel 60 in the figure, there are provided a pair of bearings 59 for rotatably supporting the power output gear wheel 60 via its boss on the lay shaft 55, one on each side of the power output gear wheel 60, again in such a manner that axial thrust may be transferred between the power output gear wheel 60 and the lay shaft 55. These bearings 59 may be slanted roller type thrust type bearings, as shown in FIG. 2. The ring gear 44 is rotationally fixed, again also in an axial thrust transmitting manner, via splines 57 to an intermediate part in the figure of the lay shaft 55.

The sun gear 42, or rather the sun gear shaft 47 to which said sun gear 42 is fixed, is selectively rotationally couplable to the carrier 45 and to the power output gear wheel 60 via a third clutch 48 or $C_3$, which is again a hydraulic fluid pressure actuated clutch of a per se well known sort which is engaged by supply of hydraulic fluid presure to a pressure chamber thereof (not shown) and is otherwise disengaged, and the sun gear 42 is similarly selectively rotationally couplable (again via the sun gear shaft 47) to the housing 26 of the transmission via a fourth brake 49 or $B_4$, which is also a hydraulic fluid pressure actuated clutch of a per se well known sort which is engaged by supply of hydraulic fluid pressure to a pressure chamber thereof (not shown) and is otherwise disengaged. Further, the sun gear 42 is also always rotationally coupled in one rotational direction only via the sun gear shaft 47 to the housing 26 of the transmission via a third one way brake 46 or $F_3$, in such a rotational sense that, as long as the internal combustion engine 1 is urging the automotive vehicle along the road, i.e. is not operating in the overrunning operational condition, the sun gear 42 is rotationally coupled to the housing 26 of the transmission, even when the hydraulically actuated brake 49 or $B_4$ is disengaged.

The lay shaft 55, which as mentioned above serves as a rotational power input shaft for the second gear transmission mechanism 13, extends along said second axis right through the third planetary gear mechanism 41, its left hand end in the figure extending as explained above through the gear wheel 54 and fixedly supporting said gear wheel 54 via its boss 69, and its right hand end as seen in the figure extending towards the side of the internal combustion engine 1 of the third planetary gear mechanism 41 and having rotatably mounted on it the power output gear wheel 60, which is as will be explained later for driving a differential device 60 and for thus serving as a power output gear of the second gear transmission mechanism 13. This lay shaft 55 is rotatably supported from the housing 26 of the transmission by two bearings 70 and 71, which are fitted at substantially the left and right hand ends in the figure of said lay shaft 55. According to a particular feature of the present invention, which will be explained hereinafter, these two support bearings for the lay shaft 55 are not thrust bearings, since they are not required to support very much axial thrust; in fact, as will be explained in more detail later, the bearing 70 is a radial ball bearing, while the bearing 71 is a radial roller bearing.

Thus. because the second gear transmission mechanism 13 is supported on the lay shaft 55 which is formed as an integral shaft which extends right through said second gear transmission mechanism 13 and through the gear wheel 54 as well, and because said lay shaft 55 is thus well supported by being supported substantially at each of its ends by the two bearings 70 and 71, thereby the construction of this transmission is durable, rigid, and strong. This allows the weight of the lay shaft 55 to be reduced as compared with the weight of corresponding members in other transmission designs, and also allows of the reduction of gear noise within the automatic transmission.

Because the first gear transmission mechanism 12 and the second gear transmission mechanism 13 are both constructed as underdrive mechanisms, each of these gear transmission mechanisms according to selective supply of actuating hydraulic fluid pressures to various ones of a plurality of friction engaging mechanisms comprised in it providing any one of a plurality of speed ratios between its rotational power input member and its rotational power output member including a directly connected speed ratio, all of said speed ratios except said directly connected speed ratio being reduction speed ratios in which the rotational power output member of said gear transmission mechanism rotates more slowly than does the rotational power input member of said gear transmission mechanism, thereby it will be easily understood that the highest speed stage of the combination of the first and the second gear transmission mechanisms 12 and 13 as linked together by the gear wheels 53 and 54 is provided when both the first gear transmission mechanism 12 is selected to its directly connected speed stage, and also the second gear transmission mechanism 13 is selected to its directly connected speed stage. In this operational condition, the ratio between the speed of the rotational power input member of the combination of the first and second gear transmission mechanisms 12 and 13, i.e. the first shaft 14, and the speed of the rotational power output member of the combination of the first and second gear transmission mechanisms 12 and 13, i.e. the lay shaft 55, is given by the ratio of the number of the teeth on the gear wheel 54 to the number of the teeth on the gear wheel 53. Typically the highest speed stage of a modern type automatic transmission is required to be a so called overdrive speed stage in which the output member of the automatic transmission rotates somewhat faster than does its input member, and accordng to this, as schematicaly shown in the figure, the number of the teeth on the gear wheel 54 will be somewhat less than the number of the teeth on the gear wheel 53. This means that the gear wheel 54 may be made smaller and more compact, than has been the case with prior art transmission designs; and this further makes for compactness and lightness of the transmission as a whole.

The power output gear wheel 60 which is rotatably mounted via the bearings 59 on the lay shaft 55 serves as a power output gear of the second gear transmission mechanism 13, and is permanently meshed with a ring gear 62 of a per se well known differential mechanism 61. This differential mechanism 61 is suited for a transverse front engine front wheel drive type automotive vehicle, and comprises a pair of helical gears 65 and 66 which are coaxially rotatably mounted to a carrier, not particularly shown, which also carries the ring gear 62, a pair of helical gears 63 and 64 each of which meshes with both of the helical gears 65 and 66, and a pair of axle shafts 67 and 68 each of which is rotationally coupled to one of the helical gears 63 and 64.

In Table I, which is located at the end of this specification and before the claims appended thereto, and which is to be understood as incorporated into this specification, there is shown, for each of the transmission speed stages that can be attained in each of the manually selected transmission ranges, i.e. as will be explained in what follows in the first speed stage, the second speed stage, the third speed stage, and the fourth speed stage in "D" or drive range, in the first speed stage, the second speed stage, and the third speed stage in "3" or third range, in the first speed stage and the second speed stage in "2" or second range, in the first speed stage only in "L" or low range, and in the only speed stage available in "R" or reverse range, the engagement conditions of each of the hydraulic fluid pressure actuated friction engagement mechanisms in the first and second gear transmission mechanism 12 and 13, i.e. of the first clutch 23 or $C_1$, of the second clutch 24 or $C_2$, of the third clutch 48 or $C_3$, of the first brake 25 or $B_1$, of the second brake 35 or $B_2$, of the third brake 37 or $B_3$, and of the fourth brake 49 or $B_4$, and the engaged or free running conditions of each of the one way clutches and brakes, i.e. of the first one way clutch 34 or F$_1$, of the second one way brake 36 or F$_2$, and of the third one way brake 46 or F$_3$. In this Table, the symbol "E" indicates that the corresponding hydraulic fluid pressure actuated friction engagement mechanism (i.e. the corresponding clutch or brake) is engaged, while the symbol "D" indicates that it is disengaged. Further, the symbol "(E)" indicates that the corresponding one way clutch or brake is transmitting rotary force, i.e. is engaged, when the internal combustion engine 1 is urging the automotive vehicle along the road, i.e. is not in the overrunning operational condition, and that in such a case this transmission of rotary force or engagement is being utilized; the symbol "e" indicates that the corresponding one way clutch or brake could be transmitting rotary force, i.e. is engaged, when the internal combustion engine 1 is urging the automotive vehicle along the road, i.e. is not in the overrunning operational condition, but that in such a case this engagement is not particularly being utilized, since transmission of rotatioal power by the transmission is in any case ensured by the engagement of some other clutch or a brake which is mounted in parallel with said one way clutch or brake; and the symbol "O" indicates that the corresponding one way clutch or brake is definitely not transmitting rotary force, i.e. is definitely disengaged, whether or not the internal combustion engine 1 is urging the automotive vehicle along the road. This Table I will be utilized in what follows for explaining the operation of the control system for the automatic transmission according to the preferred embodiment of the present invention.

A hydraulic fluid pressure control system for controlling said preferred embodiment of the automatic transmission according to the present invention is of course provided, but is not shown in the figures and will not be described in detail herein, because, based upon the explanations in this specification and upon the figures of the drawings thereof, various possible constructions for such a hydraulic fluid pressure system will be apparent to one of ordinary skill in the transmission art. In a broad functional explanation, the hydraulic fluid pressure control system receives input of hydraulic fluid pressures representing three pieces of data: a hydraulic fluid pressure, the so called throttle hydraulic fluid pressure, representing the load on the internal combustion engine 1 or the amount of depression of the accelerator pedal of the vehicle incorporating this transmission system by the foot of a driver thereof, said accelerator pedal having been previously mentioned herein but not being shown; a hydraulic fluid pressure, the so called governor hydraulic fluid pressure, representing the road speed of the vehicle incorporating this transmission system or the rotational speed of the power output gear wheel 60; and a set of hydraulic fluid pressures which together represent the shifted position of a manual transmission range selection valve, not shown in the figures either, which is set manually by the driver of the vehicle to any one of a set of positions which represent the possible ranges of the automatic transmission, i.e. to a position representing one of "D" or drive range, "3" or third range, "2" or second range, "L" or low range, or "R" or reverse range. Further, the hydraulic fluid pressure control system selectively outputs a subset of seven hydraulic fluid pressures for controlling the seven hydraulic fluid pressure actuated friction engaging devices of the automatic transmission shown in FIG. 1, i.e. for controlling the first hydraulic fluid pressure actuated clutch 23 or C$_1$, the second hydraulic fluid pressure actuated clutch 24 or C$_2$, the third hydraulic fluid pressure actuated clutch 48 or C$_3$, the first hydraulic fluid pressure actuated brake 25 or B$_1$, the second hydraulic fluid pressure actuated brake 35 or B$_2$, the third hydraulic fluid pressure actuated brake 37 or B$_3$, and the fourth hydraulic fluid pressure actuated brake 49 or B$_4$. By thus selectively supplying hydraulic fluid pressures for controlling these friction engaging mechanisms, the hydraulic fluid pressure control system engages the appropriate subset of these seven friction engaging mechanisms, as shown in Table I, so as to engage the currently appropriate speed stage of the automatic transmission as a whole, in view of the current values of the throttle hydraulic fluid pressure and of the governor hydraulic fluid pressure, i.e. of the current values of vehicle engine load and vehicle road speed, and in view of the currently selected position of the manual transmission range selection valve.

In more detail, hydraulic fluid is pressurized by a hydraulic fluid pump and is supplied to a line pressure regulation valve, which regulates the pressure of the hydraulic fluid to a predetermined line pressure level, and which supplies this line pressure hydraulic fluid to the manual transmission range selection valve, mentioned above. The manual transmission range selection valve is of a per se well known sort, and its structure will not be particularly described herein. Functionally, this manual transmission rang selection valve is set by the hand of the driver of the vehicle to which this transmission system is fitted to any one of a set of positions which represent the possible ranges of the automatic transmission, i.e. to a position representing one of the transmission ranges "D" or drive range, "3" or third range, "2" or second range, "L" or low range, or "R" or reverse range. Depending on the set position of this manual range selection valve, said manual range selection valve outputs one or the other pattern of hydraulic fluid pressures for indicating the selected transmission range, which will be utilized as explained hereinunder.

The decision as to which speed stage of the automatic transmission should be engaged in the currently manually selected transmission range, according to the current values of the throttle hydraulic fluid pressure representing the load on the internal combustion engine and the governor hydraulic fluid pressure representing the road speed of the vehicle incorporating this transmission system, is made according to the operation of various transmission shift valves (typically three in number), the movement of which decides when it is proper to shift between the various pairs of adjacent speed stages.

Each of these speed switching valves includes a bore formed in a housing and a valve element which slides reciprocatingly in said bore between two positions therein. Each of these valve elements is formed with a plurality of passages thereon, which may be annular grooves; and the side of each of the bores formed in the housing of each of the speed switching valves is formed with a plurality of openings or ports. The communication between the various ports of each of the speed switching valves is selectively controlled by the corresponding valve element according to the movement of said valve element in its bore and according to the matching that is thereby sometimes brought about and sometimes not brought about of the aforesaid passages on the valve element with the ports formed in the sides of the valve bore. Each of the valve elements of each of the speed switching valves is moved within its bore according to a particular balance relationship between the throttle hydraulic fluid pressure representing the load on the internal combustion engine and the governor hydraulic fluid pressure representing the road speed of the vehicle incorporating this transmission system, said balance relationship also including the action of a biasing compression coil spring for each speed switching valve, which biases the valve element thereof within its bore with a certain particular biasing force which is appropriate to the particular speed switching valve. Thus, for each of these speed switching valves, when the throttle hydraulic fluid pressure representing the load on the internal combustion engine prevails, in this balance relationship, over the governor hydraulic fluid pressure representing the road speed of the vehicle, then the valve element of said speed switching valve is biased to one of its positions within the valve bore thereof; but, on the other hand, when the governor hydraulic fluid pressure representing the road speed of the vehicle prevails, in this balance relationship, over the throttle hydraulic fluid pressure representing the load on the internal combustion engine, then the valve element of said speed switching valve is biased to the other of its positions within the valve bore thereof. The switching valve relating to each adjacent pair of speed stages is so constructed that its valve element is switched between its two switched positions at a vehicle road speed which is higher relative to a given throttle opening than the vehicle road speed at which the valve element of the next lower adjacent pair of speed stages is switched between its two switched positions. Further, each of the speed switching valves is constructed so that its valve element may be positively overridingly biased to its position in its valve bore correspondingly to the lower of the adjacent pair of speed stages switched between by said switching valve, irrespectve of the current values of the throttle hydraulic fluid pressure and the governor hydraulic fluid pressure, when an overriding hydraulic fluid pressure is supplied to an overriding pressure chamber of said valve. Thus supply of such an overriding hydraulic fluid pressure to any one of the speed switching valves overrides the controlling effect of the relevant balance relationship between the throttle hydraulic fluid pressure and the governor hydraulic fluid pressure on the valve elment of that speed switching valve, and instead forces the valve element of that speed switching valve to its position which provides the lower of the two adjacent speed stages switched between by said switching valve.

Now, for each of these speed switching valves, when the valve element thereof is shifted to its position within the bore thereof to which it is displaced when the throttle hydraulic fluid pressure overcomes the governor hydraulic fluid pressure in the aforesaid balance relationship appropriate to that speed switching valve, then the pattern of communication and non communication between the aforesaid switched ports of said speed switching valve provides (in conjunction with the patterns of communication and non communication between the switched ports of the other speed switching valves at this time) appropriate supply and non supply of actuating hydraulic fluid pressures for the aforesaid seven friction engaging devices of the transmission shown in FIG. 1, i.e. for the first hydraulic fluid pressure actuated clutch 23 or $C_1$, the second hydraulic fluid pressure actuated cluth 24 or $C_2$, the third hydraulic fluid pressure actuated clutch 48 or $C_3$, the first hydraulic fluid pressure actuated brake 25 or $B_1$, the second hydraulic fluid pressure actuated brake 35 or $B_2$, the third hydraulic fluid pressure actuated brake 37 or $B_3$, and the fourth hydraulic fluid presure actuated brake 49 or $B_4$, to cause said transmission to provide the lower speed stage of the pair of adjacent speed stages which are switched between by said speed switching valve. Similarly, for each of these speed switching valves, when the valve element thereof is shifted to its position within the bore thereof to which it is displaced when the governor hydraulic fluid pressure overcomes the throttle hydraulic fluid pressure in the aforesaid balance relationship appropriate to that speed switching valve, then the pattern of communication and non communication between the aforesaid switched ports of said speed switching valve provides (in conjunction with the patterns of communication and non communication between the switched ports of the other speed switching valves at this time) appropriate supply and non supply of actuating hydraulic fluid pressures for the aforesaid seven friction engaging devices of the transmission shown in FIG. 1, i.e. for the first hydraulic fluid pressure actuated clutch 23 or $C_1$, the second hydraulic fluid pressure actuated clutch 24 or $C_2$, the third hydraulic fluid pressure actuated clutch 48 or $C_3$, the first hydraulic fluid pressure actuated brake 25 or $B_1$, the second hydraulic fluid pressure actuated brake 35 or $B_2$, the third hydraulic fluid pressure actuated brake 37 or $B_3$, and the fourth hydraulic fluid pressure actuated brake 49 or $B_4$, to cause said transmission to provide the higher speed stage of the pair of adjacent speed stages which are switched between by said speed switching valve. Finally, the aforesaid hydraulic fluid pressures output by the manual transmission range selection valve for indicating the selected transmission range are utilized for being supplied (perhaps indirectly) to the various abovementioned overriding pressure chambers of said speed switching valves, as said overriding hydraulic fluid pressures, for inhibiting the trannsmission from being set to particular speed stages while particular speed ranges are set on the manual range selection valve.

Now, the operation of the hydraulic fluid pressure transmission control system will be described, as said transmission control system controls the transmission according to the preferred embodiment of the present invention which is shown with regard to its large scale architecture in FIG. 1, in each of "D" or drive range, "3" or third range, "2" or second range, "L" or low range, and "R" or reverse range, and for each stage available in each of said transmission ranges. In this connection, the operation of the transmission in "P" or parking range, and the operation of the transmission in "N" or neutral range, will not be particularly discussed, since the details of these operational modes are not directly relevant to an understanding of the operation of the transmission when the vehicle is moving, and in any case may easily be conceived of by one of ordinary skill in the transmission art, based upon the disclosure herein.

OPERATION IN "D" OR DRIVE RANGE: FIRST SPEED STAGE

When the manual transmission range selection valve is positioned by the hand of the driver of the vehicle to "D" or drive range, which is done when it is desired to drive the vehicle forwards in a normal operational mode, then none of the aforesaid biasing or overriding hydraulic fluid pressures are supplied from said manual range selection valve to any of the overriding chambers of any of the speed switching valves. Now, when the vehicle road speed as indicated by the value of the governor hydraulic fluid pressure is low as compared with the load on the internal combustion engine 1 as indicated by the value of the throttle hydraulic fluid pressure, then, according to the aforesaid balance relationship between said throttle hydraulic fluid pressure and said governor hydraulic fluid pressure according to which the valve element of the speed switching valve for switching between the first speed stage and the second speed stage is controlled, said valve element is shifted by the action of said throttle hydraulic fluid pressure which overcomes the action of said governor hydraulic fluid pressure thereon to its position within the bore of said speed switching valve which ensures that the the only friction engaging mechanisms which are supplied with actuating hydraulic fluid pressure are the first clutch $C_1$ (i.e., 23 in FIG. 1) and the fourth brake $B_4$ (i.e., 49 in FIG. 1), so as to engage them. Thus, actuating hydraulic fluid prssures are supplied to the various friction engaging mechanisms of the transmission shown in FIG. 1 as shown by the first line of Table I, and, as will be understood by one of ordinary skill in the transmission art based upon the disclosure herein, the transmission is set to its first speed stage. And in this first speed stage both the first gear transmission mechanism 12 and the second gear transmission mechanism 13 are functioning in their underdrive modes, and neither of them functions in its directly connected mode.

THE SECOND SPEED STAGE (IN "D" RANGE)

Now, when the vehicle road speed as indicated by the value of the governor hydraulic fluid pressure is somewhat higher as compared with the load on the internal combustion engine 1 as indicated by the value of the throttle hydraulic fluid pressure than in the previously explained first speed case, then, according to the aforesaid balance relationship between said throttle hydraulic fluid pressure and said governor hydraulic fluid pressure according to which the valve element of said speed switching valve which switches between the first speed stage and the second speed stage is controlled, said valve element is shifted by the action of said governor hydraulic fluid pressure which overcomes the action of said throttle hydraulic fluid pressure thereon to its position within the bore of said speed switching valve which ensures that the only friction engaging mechanisms which are supplied with actuating hydraulic fluid pressure are the first clutch $C_1$ (i.e., 23 in FIG. 1), the second brake $B_2$ (i.e., 35 in FIG. 1), and the fourth brake $B_4$ (i.e. 49 in FIG. 1), so as to engage them. Thus, actuating hydraulic fluid pressures are supplied to the various friction engaging mechanisms of the transmission shown in FIG. 1 as shown by the second line of Table I, and, as will be understood by one of ordinary skill in the transmission art based upon the disclosure herein, the transmission is set to its second speed stage. And again in this second speed stage both the first gear transmission mechanism 12 and the second gear transmission mechanism 13 are functioning in their underdrive modes, and neither of them functions in its directly connected mode.

THE THIRD SPEED STAGE (IN "D" RANGE)

Now, when the vehicle road speed as indicated by the value of the governor hydraulic fluid pressure is rather higher as compared with the load on the internal combustion engine 1 as indicated by the value of the throttle hydraulic fluid pressure than in the previously explained first and second speed cases, then, according to the aforesaid balance relationship between said throttle hydraulic fluid pressure and said governor hydraulic fluid pressure according to which the valve element of said speed switching valve which switches between the second speed stage and the third speed stage is controlled, said valve element is shifted by the action of said governor hydraulic fluid pressure which overcomes the action of said throttle hydraulic fluid pressure thereon to its position within the bore of said sped switching valve which ensures that the only friction engaging mechanisms which are supplied with actuating hydraulic fluid pressure are the first clutch $C_1$ (i.e., 23 in FIG. 1), the second clutch $C_2$ (i.e., 24 in FIG. 1), the second brake $B_2$ (i.e., 35 in FIG. 1), and the fourth brake $B_4$ (i.e. 49 in FIG. 1), so as to engage them. Thus, actuating hydraulic fluid pressures are supplied to the various friction engaging mechanisms of the transmission shown in FIG. 1 as shown by the third line of Table I, and, as will be understood by one of ordinary skill in the transmission art based upon the disclosure herein, the transmission is set to its third speed stage. Now in this third speed stage the first gear transmission mechanism 12 is functioning in its directly connected mode, while the second gear transmission mechanism 13 is still functioning in its underdrive mode.

THE FOURTH SPEED STAGE (IN "D" RANGE)

Now, when the vehicle road speed as indicated by the value of the governor hydraulic fluid pressure is yet higher as compared with the load on the internal combustion engine 1 as indicated by the value of the throttle hydraulic fluid pressure than in the previously explained first, second, and third speed cases, then, according to the aforesaid balance relationship between said throttle hydraulic fluid pressure and said governor hydraulic fluid pressure according to which the valve element of said speed switching valve which switches between the third speed stage and the fourth speed stage in controlled, said valve element is shifted by the action of said governor hydraulic fluid pressure which overcomes the action of said throttle hydraulic fluid pressure thereon to its position within the bore of said speed switching valve which ensures that the only friction engaging mechanisms which are supplied with actuating hydraulic fluid pressure are the first clutch $C_1$ (i.e., 23 in FIG. 1), the second clutch $C_2$ (i.e., 24 in FIG. 1), the third clutch $C_3$ (i.e., 48 in FIG. 1), and the second brake $B_2$ (i.e., 35 in FIG. 1), so as to engage them. Thus, actuating hydraulic fluid pressure are supplied to the various friction engaging mechanisms of the transmission shown in FIG. 1 as shown by the fourth line of Table I, and, as will be understood by one of ordinary skill in the transmission art based upon the disclosure herein, the transmission is set to its fourth speed stage. Now in this fourth speed stage the first gear transmission mechanism 12 is functioning in its directly connected mode, and also the second gear transmission mechanism 13 is now functioning in its directly connected mode. Accordingly, the gearing ratio provided by the transmission as a whole is simply the ratio between the numbers of teeth on the gear wheels 53 and 54, and in the case of the shown preferred embodiment of the transmission according to the present invention, as can be seen from FIG. 1, this is an overdrive gearing ratio, since the number of teeth on the gear wheel 54 is less than the number of teeth on the gear wheel 53.

OPERATION IN "3" OR THIRD RANGE

When the manual transmission range selection valve is positioned by the hand of the driver of the vehicle to "3" or third range, which is done when it is desired to drive the vehicle forwards in an operational mode which provides a moderate amount of engine braking at a somewhat lower speed than in normal driving, then the relevant balance relationship between the throttle hydraulic fluid pressure and the governor hydraulic fluid pressure on the valve element of that speed switching valve which switches between the third speed stage and the fourth speed stage is not allowed to control it, but instead the valve element of that speed switching valve is forcibly moved, by the supply of the appropriate forcible biasing or overriding pressure which the overriding chamber of said switching valve now receives from the manual range selection valve, to its position within the bore of said switching valve which corresponds to the third speed stage of the transmission, as explained above. Accordingly the fourth speed stage of the automatic transmission, in which the second gear transmission mechanism 13 is providing its directly connected speed stage, is definitely never made available, no matter what may be the values of the throttle hydraulic fluid pressure and the governor hydraulic fluid pressure. Further, this overriding hydraulic fluid pressure is also supplied to other points in the hydraulic fluid pressure control system, as appropriate, according to the detailed construction thereof.

THE FIRST SPEED STAGE (IN "3" RANGE)

Now, when the vehicle road speed as indicated by the value of the governor hydraulic fluid pressure is low as compared with the load on the internal combustion engine 1 as indicated by the value of the throttle hydraulic fluid pressure, then, according to the aforesaid balance relationship between said throttle hydraulic fluid pressure and said governor hydraulic fluid prssure according to which the valve element of the speed switching valve for switching between the first speed stage and the second speed stage is controlled, said valve element is shifted by the action of said throttle hydraulic fluid pressure which overcomes the action of said governor hydraulic fluid pressure thereon to its position within the bore of said speed switching valve which ensures that the only friction engaging mechanisms which are supplied with actuating hydraulic fluid pressure are the first clutch $C_1$ (i.e., 23 in FIG. 1) and the fourth brake $B_4$ (i.e., 49 in FIG. 1), so as to engage them. Thus, actuating hydraulic fluid pressures are supplied to the various friction engaging mechanisms of the transmission shown in FIG. 1 as shown by the fifth line of Table I, and, as will be understood by one of ordinary skill in the transmission art based upon the disclosure herein, the transmission is set to its first speed stage. And again in this first speed stage both the first gear transmission mechanism 12 and the second gear transmission mechanism 13 are functioning in their underdrive modes, and neither of them functions in its directly connected mode.

THE SECOND SPEED STAGE (IN "3" RANGE)

Now, when the vehicle road speed as indicated by the value of the governor hydraulic fluid pressure is somewhat higher as compared with the load on the internal combustion engine 1 as indicated by the value of the throttle hydraulic fluid pressure than in the just previously explained first speed case, then, according to the aforesaid balance relationship between said throttle hydraulic fluid pressure and said governor hydraulic fluid pressure according to which the valve element of said speed switching valve which switches between the first speed stage and the second speed stage is controlled, said valve element is shifted by the action of said governor hydraulic fluid pressure which overcomes the action of said throttle hydraulic fluid pressure thereon to its position within the bore of said speed switching valve which ensures that the only friction engaging mechanisms which are supplied with actuating hydraulic fluid pressure are the first clutch $C_1$ (i.e., 23 in FIG. 1), the first brake $B_1$ (i.e., 25 in FIG. 1), the second brake $B_2$ (i.e., 35 in FIG. 1), and the fourth brake $B_4$ (i.e. 49 in FIG. 1), so as to engage them. Thus, actuating hydraulic fluid pressures are supplied to the various friction engaging mechansims of the transmission shown in FIG. 1 as shown by the sixth line of Table I, and, as will be understood by one of ordinary skill in the transmission art based upon the disclosure herein, the transmission is set to its second speed stage. And in this second speed stage both the first gear transmission mechanism 12 and the second gear transmission mechanism 13 are functioning in their underdrive modes, and neither of them functions in its directly connected mode.

THE THIRD SPEED STAGE (IN "3" RANGE)

Now, when the vehicle road speed as indicated by the value of the governor hydraulic fluid pressure is rather higher as compared with the load on the internal combustion engine 1 as indicated by the value of the throttle hydraulic fluid pressure than in the previously explained first and second speed cases, then, according to the aforesaid balance relationship between said throttle hydraulic fluid pressure and said governor hydraulic fluid pressure according to which the valve element of said speed switching valve which switches between the second speed stage and the third speed stage is controlled, said valve element is shifted by the action of said governor hydraulic fluid pressure which overcomes the action of said throttle hydraulic fluid pressure thereon to its position within the bore of said speed switching valve which ensures that the only friction engaging mechanisms which are supplied with actuating hydraulic fluid pressure are the first clutch $C_1$ (i.e., 23 in FIG. 1), the second clutch $C_2$ (i.e., 24 in FIG. 1), the second brake $B_2$ (i.e., 35 in FIG. 1), and the fourth brake $B_4$ (i.e. 49 in FIG. 1), so as to engage them. Thus, actuating hydraulic fluid pressures are supplied to the various friction engaging mechanisms of the transmission shown in FIG. 1 as shown by the seventh line of Table I, and, as will be understood by one of ordinary skill in the transmission art based upon the disclosure herein, the transmission is set to its third speed stage. Now in this third speed stage the first gear transmission mechanism 12 is functioning in its directly connected mode, while the second gear transmission mechanism 13 is still functioning in its underdrive mode.

OPERATION IN "2" OR SECOND RANGE

When the manual transmission range selection valve is positioned by the hand of the driver of the vehicle to "2" or second range, which is done when it is desired to drive the vehicle forwards in an operational mode which provides a more positive amount of engine braking at a lower speed than in driving in "3" range, then further the relevant balance relationship between the throttle hydraulic fluid pressure and the governor hydraulic fluid pressure on the valve element of that speed switching valve which switches between the second speed stage and the third speed stage is also not allowed to control it, but instead the valve element of that speed switching valve is also forcibly moved, by the supply of the appropriate forcible biasing or overriding pressure which the overriding chamber of said switching valve now receives from the manual range selection valve, to its position within the bore of said switching valve which corresponds to the second speed stage of the transmission, as explained above. Accordingly the third speed stage of the automatic transmission, in which the first gear transmission mechanism 12 is providing its directly connected speed stage, is definitely never made available, no matter what may be the values of the throttle hydraulic fluid pressure and the governor hydraulic fluid pressure; and, a fortiori, the fourth speed stage of the automatic transmission, in which the second gear transmission mechanism 13 is providing its directly connected speed stage, is never made available either. Further, this overriding hydraulic fluid pressure is also supplied to other points in the hydraulic fluid pressure control system, as appropriate, according to the detailed construction thereof.

THE FIRST SPEED STAGE (IN "2" RANGE)

Now, when the vehicle road speed as indicated by the value of the governor hydraulic fluid pressure is low as compared with the load on the internal combustion engine 1 as indicated by the value of the throttle hydraulic fluid pressure, then, according to the aforesaid balance relationship between said throttle hydraulic fluid pressure and said governor hydraulic fluid pressure according to which the valve element of the speed switching valve for switching between the first speed stage and the second speed stage is controlled, said valve element is shifted by the action of said throttle hydraulic fluid pressure which overcomes the action of said governor hydraulic fluid pressure thereon to its position within the bore of said speed switching valve which ensures that the only friction engaging mechanisms which are supplied with actuating hydraulic fluid pressure are the first clutch $C_1$ (i.e., 23 in FIG. 1) and the fourth brake $B_4$ (i.e., 49 in FIG. 1), so as to engage them. Thus, actuating hydraulic fluid pressures are supplied to the various friction engaging mechanisms of the transmission shown in FIG. 1 as shown by the eighth line of Table I, and, as will be understood by one of ordinary skill in the transmission art based upon the disclosure herein, the transmission is set to its first speed stage. And again in this first speed stage both the first gear transmission mechanism 12 and the second gear transmission mechanism 13 are functioning in their underdrive modes, and neither of them functions in its directly connected mode.

THE SECOND SPEED STAGE (IN "2" RANGE)

Now, when the vehicle road speed as indicated by the value of the governor hydraulic fluid pressure is somewhat higher as compared with the load on the internal combustion engine 1 than in the just previously explained first speed case, then, according to the aforesaid balance relationship between said throttle hydraulic fluid pressure and said governor hydraulic fluid pressure according to which the valve element of said speed switching valve which switches between the first speed stage and the second speed stage is controlled, said valve element is shifted by the action of said governor hydraulic fluid pressure which overcomes the action of said throttle hydraulic fluid pressure thereon to its position within the bore of said speed switching valve which ensures that the only friction engaging mechanisms which are supplied with actuating hydraulic fluid pressure are the first clutch $C_1$ (i.e., 23 in FIG. 1), the first brake $B_1$ (i.e., 25 in FIG. 1), the second brake $B_2$ (i.e., 35 in FIG. 1), and the fourth brake $B_4$ (i.e., 49 in FIG. 1), so as to engage them. Thus, actuating hydraulic fluid pressures are supplied to the various friction engaging mechanisms of the transmission shown in FIG. 1 as shown by the ninth line of Table I, and, as will be understood by one of ordinary skill in the transmission art based upon the disclosure herein, the transmission is set to its second speed stage. And in this second speed stage both the first gear transmission mechanism 12 and the second gear transmission mechanism 13 are functioning in their underdrive modes, and neither of them functions in its directly connected mode.

OPERATION IN "L" OR LOW RANGE (FIRST SPEED ONLY)

When the manual transmission range selection valve is positioned by the hand of the driver of the vehicle to "L" or low range, which is done when it is desired to drive the vehicle forwards in an operational mode which provides a large amount of engine braking at a very low speed, then yet further the relevant balance relationship between the throttle hydraulic fluid pressure and the governor hydraulic fluid pressure on the valve element of that speed switching valve which switches between the first speed stage and the second speed stage is also not allowed to control it, but instead the valve element of that speed switching valve is also forcibly moved, by the supply of the appropriate forcible biasing or overriding pressure which the overriding chamber of said switching valve now receives from the manual range selection valve, to its position within the bore of said switching valve which corresponds to the first speed stage of the transmission, as explained above. Thus none of the speed switching valves is actually functional. Thus, the second speed stage of the automatic transmission is definitely never made available, no matter what may be the values of the throttle hydraulic fluid pressure and the governor hydraulic fluid pressure; and, a fortiori, the third speed stage of the automatic transmission, in which the first gear transmission mechanism 12 is providing its directly connected speed stage, and the fourth speed stage of the automatic transmission, in which the second gear transmission mechanism 13 is providing its directly connected speed stage, are never made available either. Further, this overriding hydraulic fluid pressure is also supplied to other points in the hydraulic fluid pressure control system, as appropriate, according to the detailed construction thereof.

Now, irrespective of the value of the vehicle road speed as indicated by the value of the governor hydraulic fluid pressure and irrespective of the aforesaid balance relationship between said throttle hydraulic fluid pressure and said governor hydraulic fluid pressure according to which the valve element of the speed switching valve which switches between the first speed stage and the second speed stage is controlled, said valve element is overridingly shifted by the action of this overriding hydraulic fluid pressure to its position which corresponds to the first speed stage. Thus the transmission is fixedly held in its first speed stage operational condition. In this operational condition, the only friction engaging mechanisms which are supplied with actuating hydraulic fluid pressure are the first clutch $C_1$ (i.e., 23 in FIG. 1), the third brake $B_3$ (i.e., 37 in FIG. 1), and the fourth brake $B_4$ (i.e., 49 in FIG. 1), so as to engage them. Thus, actuating hydraulic fluid pressures are supplied to the various friction engaging mechanisms of the transmission shown in FIG. 1 as shown by the tenth line of Table I, and, as will be understood by one of ordinary skill in the transmission art based upon the disclosure herein, the transmission is set to its first speed stage. And again in this first speed stage both the first gear transmission mechanism 12 and the second gear transmission mechanism 13 are functioning in their underdrive modes, and neither of them functions in its directly connected mode.

OPERATION IN "R" OR REVERSE RANGE

When the manual transmission range selection valve is positioned by the hand of the driver of the vehicle to "R" or reverse driving range, which is done when it is desired to drive the vehicle in a backwards direction, then by the supply of appropriate forcible biasing or overriding pressures which the overriding chambers of said switching valves now receive from the manual range selection valve, and possibly by the supply of other pressures from the manual range selection valve to the hydraulic fluid pressure control system, the result is obtained that the only friction engaging mechanisms which are supplied with actuating hydraulic fluid pressure so as to engage them are the second clutch $C_2$ (i.e., 24 in FIG. 1), the third brake $B_3$ (i.e., 37 in FIG. 1), and the fourth brake $B_4$ (i.e., 49 in FIG. 1). Thus, actuating hydraulic fluid pressures are supplied to the various friction engaging mechanisms of the transmission shown in FIG. 1 as shown by the eleventh and last line of Table I, and, as will be understood by one of ordinary skill in the transmission art based upon the disclosure herein, the transmission is set to its reverse speed stage. And again in this reverse speed stage both the first gear transmission mechanism 12 and the second gear transmission mechanism 13 are functioning in their underdrive modes, and neither of them functions in its directly connected mode.

Now, referring to FIG. 2, a detailed cross sectional view showing the construction of the second gear transmission mechanism 13 is shown, taken in a sectional plane which includes the central rotational axis of said second gear transmission mechanism 13, i.e. the second axis. The second gear 54 is rotationally fixed to the lay shaft 55 via splines 56, and is also axially secured to said lay shaft 55 in such a way that axial force may be transmitted therebetween. According to a particular feature of the present invention, the first gear 53 and the second gear 54 are constructed as helically cut gears which of course are of opposite handedness, and in fact the first gear 53 is left handed, while the second gear 54 is right handed. Thus, when the transmission according to the preferred embodiment of the present invention shown in FIG. 1 is driven in a non engine braking mode by the crankshaft 2 of the internal combustion engine 1 rotating in the clockwise rotational direction as seen from the right hand side of FIG. 1 and powering the vehicle along the road, and when the first gear transmission mechanism 1 is selected to any one of its forward speed stages, then the second gear wheel 54 is impelled by the first gear wheel 53 to the right as seen in FIGS. 1 and 2. This rightwards axial impulse from the point of view in the drawing is transmitted to the lay shaft 55.

Now, the sun gear 42 and the sun gear shaft 47 fixedly connected therewith are supported from the left hand side in the figure by a tubular part 26a of the transmission housing 26 via a thrust bearing 72. Thus this thrust bearing 72 absorbs any force acting on the sun gear 42 which tends to urge said sun gear 42 to the left in the figures. Further, between the ring gear 44 and the sun gear 42 there is provided another thrust bearing 73, and between the power output gear wheel 60 and the ring gear 44 there is provided yet another thrust bearing 74. Since as explained above the bearings 59 which support the power output gear wheel 60 rotatably on the lay shaft 55 are thrust transmitting bearings which can transfer axial thrust in both directions between the power output gear wheel 60 and the lay shaft 55, thus all these members—the lay shaft 55, the power output gear wheel 60, the ring gear 44, and the sun gear 42 and its sun gear shaft 47—are positively supported by the thrust bearing structure as outlined above from the transmission casing 26 and are prevented from moving to the left in the figures.

Further, the power output gear wheel 60 is constructed as a helically cut gear wheel which is left handed, while the corresponding ring gear 62 of the differential mechanism 61 is of course correspondingly constructed as a helically cut gear wheel which is right handed. Thus, again when the transmission according to the preferred embodiment of the present invention shown in FIG. 1 is driven in a non engine braking mode by the crankshaft 2 of the internal combustion engine 1 rotating in the clockwise rotational direction as seen from the right hand side of FIG. 1 and powering the vehicle along the road, and when the first gear transmission mechanism 1 is selected to any one of its forward speed stages, provided that the twisting angles of the first gear wheel 53, the second gear wheel 54, the power output gear wheel 60, and the corresponding ring gear 62 of the differential mechanism 61 are properly chosen during design of the transmission, then the power output gear wheel 60 and the lay shaft 55 axially coupled thereto are subjected to an axial thrust from ring gear 62 of the differential mechanism 61 in the leftward direction in the figure which is sufficient to balance the above mentioned thrust in the rightward direction in the figure exerted by the second gear wheel 54 on the lay shaft 55. Accordingly the lay shaft 55 is not particularly urged in the rightwards direction in the figure, and hence no particular thrust bearing structure to absorb rightwards thrust on the lay shaft 55 is required or provided.

When the second gear transmission mechanism 13 is selected to its direct connection speed stage, i.e. when the third clutch $C_3$ (or 48 in FIG. 1) is engaged and the fourth brake $B_4$ (or 49 in FIG. 1) is disengaged, then no other forces are acting on the lay shaft 55, and also the leftwards force exerted by the power output gear wheel 60 on the lay shaft 55 via the bearings 59 is relatively less, since the force on the teeth of the power output gear wheel 60 exerted by the teeth of the ring gear 62 of the differential mechanism 61 is relatively less. When, on the other hand, the second gear transmission mechanism 13 is selected to its speed reducing speed stage, i.e. when the third clutch $C_3$ (or 48 in FIG. 1) is disengaged and the fourth brake $B_4$ (or 49 in FIG. 1) is engaged, then the leftwards force exerted by the power output gear wheel 60 on the lay shaft 55 via the bearings 59 is relatively greater, since the force on the teeth of the power output gear wheel 60 exerted by the teeth of the ring gear 62 of the differential mechanism 61 is relatively greater, since the second gear transmission mechanism is reducing rotational speed of the rotational power transmitted through it and is accordingly increasing the torque thereof. Now, since according to another particular feature of the present invention the sun gear 42 of the second planetary gear mechanism 13 is constructed as a helically cut gear which is left handed, the planetary pinions 43 are constructed as helically cut gears which are right handed, and the ring gear 44 is constructed as a helically cut inside gear which is right handed, therefore in this speed reducing operational condition of the second gear transmission mechanism 13 the ring gear 44 is also being impelled to the right in the figure by its engagement via the planetary pinions 43 with the sun gear 42, the equal and opposite impelling of which to the left in the figure is of course sustained by the tubular extension 26a of the transmission casing 26 via the thrust bearing 72. This force impelling the ring gear 44 to the right in the drawing is transmitted to the lay shaft 55 via the thrust bearing 74 and the power output gear wheel 60 and the bearings 59, and accordingly, provided that the twisting angles of the sun gear 42, the planetary pinions 43, and the ring gear 44 are again properly selected during the design process of the transmission, the total rightwards force on said lay shaft 55 will be just enough to balance the rightwards force on the lay shaft 55 exerted by the power output gear wheel 60, which is relatively larger than before, as explained above.

On the other hand, when the vehicle is being operated in either engine braking mode or in reverse range, then the sun gear 42 of the second planetary gear mechanism 13 is urged by its engagement with the planetary pinions 43 in the rightwards direction in the figure, while the ring gear 44 is urged by its engagement with the planetary pinions 43 in the leftwards direction in the figure. These mutual urgings are borne by the thrust bearing 73. Accordingly, the balancing of the thrust on the lay shaft 55 can still be effective.

By this construction of the second gear transmission mechanism 13, therefore, the axial forces on the lay shaft 55 can be substantially balanced, and therefore no particular thrust bearing structure for the lay shaft 55 is required. In line with this, as shown in FIG. 2 and schematically shown in FIG. 1, the lay shaft 55 is supported at is left hand end in the figures by a ball bearing 70 (via the boss 69 of the second gear wheel 54) and at its right hand end in the figures by a roller bearing 71, neither of these bearings having any particular thrust absorbing capability. This is possible because of the particular detailed construction of the second gear transmission mechanism, as stated above. This has the desirable consequences of reducing power loss in these bearings, and of accordingly increasing the power transmission efficiency of the second gear transmission mechanism 13 and of the transmission as a whole.

Now, in the shown preferred embodiment of the transmission according to the present invention, by suitable choosing of the numbers of gear cogs on the various gear wheels, it is possible to so arrange matters that the first gear transmission mechanism 12 is capable of providing four different rotational speed reduction ratios, as follows: a lowest reduction ratio, equal to 2.811 (i.e., in which the rotational power output shaft of said first gear transmission mechanism 12, the shaft 40, rotates 1/2.811 times as fast as does the rotational power input shaft of said first gear transmission mechanism 12, the shaft 14); an intermediate reduction ratio, equal to 1.549; a highest reduction ratio, equal to 1.000 (in this case of course the first gear transmission mechanism 12 is in its directly connected state); and a reverse reduction ratio, equal to 2.296. Further, it is possible to so arrange matters so that the second gear transmission mechanism 13 is capable of providing two different rotational speed reduction ratios, as follows: a lower reduction ratio, equal to 1.452 (i.e., in which the rotational power output member of said gear transmission mechanism 12, the power output gear wheel 60, rotates 1/1.452 times as fast as does the rotational power input shaft of said first gear transmission mechanism 12, the hollow shaft 41), and a higher reduction ratio, equal to 1.000 (in this case of course the second gear transmission mechanism 13 is in its directly connected state). In this case, provided that also the ratio between the number of teeth on the gear wheel 54 and the number of teeth on the gear wheel 53 is 0.9, which is convenient, as explained above, for making the gear wheel 54 compact and for reducing the bulge in the casing of the automatic transmission assembly which is required to be provided for housing said gear wheel 54, and if the gearing ratio available from the differential mechanism 61 as a whole is in the range 2.2 to 3.0, then the total rotational reduction ratios available for the transmission as a whole, from the rotational power input member for said transmission, i.e. the first shaft 14, to the rotational power output member for said transmission, i.e. the power output gear wheel 60, are in the following ranges in each of the speed stages of the transmission: for the first speed stage, in which the first gear transmission mechanism 12 is providing its lowest reduction ratio and the second gear transmission mechanism 13 is providing its lower reduction ratio, 8.08 to 11.02; for the second speed stage, in which the first gear transmission mechanism 12 is providing its intermediate reduction ratio and the second gear transmission mechanism 13 is providing its lower reduction ratio, 4.45 to 6.07; for the third speed stage, in which the first gear transmission mechanism 12 is providing its highest reduction ratio and the second gear transmission mechanism 13 is providing its lower reduction ratio, 2.87 to 3.92; for the fourth speed stage, in which the first gear transmission mechanism 12 is providing its highest reduction ratio and the second gear transmission mechanism 13 is also providing its higher reduction ratio, 1.98 to 2.70; and for the reverse speed stage, in which the first gear transmission mechanism 12 is providing its reverse reduction ratio and the second gear transmission mechanism 13 is providing its lower reduction ratio, 6.00 to 9.00. These reduction ratios provided by the first gear transmission mechanism 12 and the second gear transmission mechanism 13 and the total reduction ratios of the transmission as a whole including the differential mechanism 61, for each of the speed stages, are summarized in Table II, which is located at the end of this specification and is to be understood as included therein. As will be understood by one of ordinary skill in the art from the above descriptions, and from Table II, the total rotational reduction ratios available for the transmission as a whole, in the various speed stages thereof, are within the usually appropriate ranges which are generally convenient and used; while on the other hand the reduction gearing ratio required for producing this result from the differential mechanism 61 as a whole, which is in the range 2.2 to 3.0 in the present invention as shown above and in the Table, is substantially lower than is conventional—conventionally a reduction range 3.9 to 4.2 has been used for the differential mechanism. Accordingly, because the differential mechanism 61 is thus not required to provide such a high reduction gearing ratio as was heretofore required, it can be manufactured as smaller and lighter, and thereby the objectives of reducing the weight and size of the overall drive train are made very much easier of accomplishment.

Advantages of constructing the automatic transmission according to the present invention in the manner shown, among others, are that, by incorporating both the first gear transmission mechanism 12 and the second gear transmission mechanism 13, the first gear transmission mechanism 12 being provided as lying along the first axis which lies along the upper part of FIG. 1, while the second gear transmission mechanism 13 is provided as lying along the second axis which lies along the lower part of FIG. 1 and is parallel with and displaced from the first axis, the overall construction of the automatic transmission is rendered remarkably compact, and its axial length is very greatly reduced as compared with conventional designs of the sort outlined in this specification. Further, the transmission is easy and cheap to manufacture, and easy to assemble and to service after assembly. Because the lay shaft 55 passes through the second gear transmission mechanism 13, its bearing structure (comprising the bearing devices 70 and 71) is as a matter of course rendered much simpler than would be the case if said lay shaft 55 only extended from one side of said second gear transmission mechanism 13. The increased rigidity of the support of the lay shaft 55 also means that the transmission is strong and durable during use; and, as a matter of course, reduces the gear noise that is caused by the operation of the transmission, thus rendering the transmission more environmentally acceptable, and increasing the drivability of the automotive vehicle to which said transmission is fitted.

By the first gear transmission mechanism 12 and the second gear transmission mechanism 13 both being constructed as underdrive mechanisms, each being selectively controllable to produce any one of a plurality of speed ratios between its power input member and its power output member all of which are speed reducing ratios except one which is a directly connected speed ratio equal to unity, thus the highest speed stage of the transmission as a whole is obtained both by engaging the first gear transmission mechanism 12 to its directly connected speed ratio and by engaging the second gear transmission mechanism 13 to its directly connected speed ratio. Since the highest speed stage of the automatic transmission is the speed stage which typically will be used for the highest proportion of the operating time of the transmission, and since the directly connected speed ratio of a gear transmission mechanism is typically the speed ratio thereof during the provision of which the gear transmission mechanism is worn to the least extent and makes the least amount of noise, the feature described above implies that the automatic transmission according to the present invention is quiet and reliable.

Now, because the number of teeth on the second gear wheel 54 is less than the number of teeth on the first gear wheel 53, therefore the aforesaid highest speed stage of the transmission as a whole will be an overdrive speed stage, in which the power output gear wheel 57 rotates more quickly than does the rotational power input member of the first gear transmission mechanism (i.e., the shaft 14). Further, according to this feature, the second gear wheel 54 will be smaller than the first gear wheel 53, and accordingly the bulge (not particularly shown) which is required as a matter of course to be provided as formed in the transmission housing 26 to house said second gear wheel 54 is smaller than would otherwise be the case. This means that the transmission as a whole is made more compact; and also when the second axis is provided as lying generally under the first axis as typically will be the case, then particularly the bulge on the lower part of the transmission due to the provision of space for housing said second gear wheel 54 is reduced. This means that the danger of interference between this bulge and the drive shaft (also not particularly shown) which drives the wheel on that side of the longitudinal axis of the vehicle is reduced or eliminated, which is very helpful from the design and assembly points of view, as well as simplifying the servicing of the automotive vehicle after assembly.

With the hydraulic fluid pressure control system as explained above being used to control the transmission according to the present invention, it will be understood from the explanations above that the control system can control the first gear transmission mechanism 12 and the second gear transmission mechanism 13 to provide their various speed ratios, and by suitable combinations of these speed ratios being provided together various suitable speed ratios for the speed stages of the transmission as a whole can be concocted. Further, as mentioned above, the aforesaid highest speed stage of the transmission as a whole will be an overdrive speed stage, in which the power output gear wheel 60 rotates more quickly than does the rotational power input member of the first gear transmission mechanism (the shaft 14), and the ratio of the rotational speeds of these members will be given by the ratio of the number of teeth on the first gear wheel 53 to the number of teeth on the second gear wheel 54.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

TABLE I

|  | $C_1$ (23) | $C_2$ (24) | $C_3$ (48) | $B_1$ (25) | $B_2$ (35) | $B_3$ (37) | $B_4$ (49) | $F_1$ (34) | $F_2$ (36) | $F_3$ (46) |
|---|---|---|---|---|---|---|---|---|---|---|
| DRIVE RANGE: | | | | | | | | | | |
| FIRST SPEED | E | D | D | D | D | D | E | O | (E) | e |

TABLE I-continued

|  | $C_1$ (23) | $C_2$ (24) | $C_3$ (48) | $B_1$ (25) | $B_2$ (35) | $B_3$ (37) | $B_4$ (49) | $F_1$ (34) | $F_2$ (36) | $F_3$ (46) |
|---|---|---|---|---|---|---|---|---|---|---|
| SECOND SPEED | E | D | D | D | E | D | E | (E) | O | e |
| THIRD SPEED | E | D | E | D | E | D | E | O | O | e |
| FOURTH SPEED | E | E | E | D | E | D | D | O | O | O |
| THIRD RANGE: |  |  |  |  |  |  |  |  |  |  |
| FIRST SPEED | E | D | D | D | D | D | E | O | (E) | e |
| SECOND SPEED | E | D | D | E | E | D | E | (E) | O | e |
| THIRD SPEED | E | D | E | D | E | D | E | O | O | e |
| SECOND RANGE: |  |  |  |  |  |  |  |  |  |  |
| FIRST SPEED | E | D | D | D | D | D | E | O | (E) | e |
| SECOND SPEED | E | D | D | E | E | D | E | e | O | e |
| LOW RANGE: |  |  |  |  |  |  |  |  |  |  |
| FIRST SPEED | E | D | D | D | D | E | E | O | e | e |
| REVERSE RANGE | D | E | D | D | D | E | E | O | O | O |

TABLE II

|  | First gear transmission mechanism 12 gearing ratio | Gear wheels 53 and 54 gearing ratio | Second gear transmission mechanism 13 gearing ratio | Differential mechanism 61 gearing ratio | Overall gearing ratio |
|---|---|---|---|---|---|
| FIRST SPEED | 2.811 | 0.9 | 1.452 | 2.2–3.0 | 8.08–11.02 |
| SECOND SPEED | 1.549 | 0.9 | 1.452 | 2.2–3.0 | 4.45–6.07 |
| THIRD SPEED | 1.000 | 0.9 | 1.452 | 2.2–3.0 | 2.87–3.92 |
| FOURTH SPEED | 1.000 | 0.9 | 1.000 | 2.2–3.0 | 1.98–2.70 |
| REVERSE SPEED | 2.296 | 0.9 | 1.452 | 2.2–3.0 | 6.00–9.00 |

What is claimed is:

1. An automatic transmission for an automotive vehicle, comprising:
   a. a fluid torque converter, comprising a converter rotational power input member and a converter rotational power output member, said converter rotational power input member and said converter rotational power output member both being rotatable about a first axial line;
   b. a first gear transmission mechanism, comprising a first transmission rotational power input member and a first transmission rotational power output member, and being adapted to be selectively controlled to produce any one of a plurality of speed ratios between said first transmission rotational power input member and said first transmission rotational power output member, said first transmission rotational power input member and said first transmission rotational power output member both being rotatable about said first axial line; said first transmission rotational power input member being rotationally coupled with said converter rotational power output member;
   c. a through lay shaft which extends along and is rotatable about a second axial line parallel to said first axial line and displaced laterally therefrom;
   d. a second gear transmission mechanism supported by said through lay shaft to be rotatable about said second axial line, comprising a second transmission rotational power input member and a second transmission rotational power output member, and being adapted to be selectively controlled to produce any one of a plurality of speed ratios between said second transmission rotational power input member and said second transmission rotational power output member, said second transmission rotational power input member being rotationally coupled with said through lay shaft and said second transmission rotational power output member being rotatable about and relative to said through lay shaft;
   e. a rotational power transfer mechanism for transferring rotational power between said first transmission rotational power output member and said through lay shaft, including a first rotational member rotatable about said first axial line and rotationally coupled with said first transmission rotational power output member and a second rotational member rotatable about said second axial line and supported by and rotationally coupled with said through lay shaft; and
   f. a power output gear wheel rotatable about said second axial line and rotatably supported by said through lay shaft and rotationally coupled with said second transmission rotational power output member.

2. An automatic transmission for an automotive vehicle according to claim 1, wherein said second gear transmission mechanism comprises a planetary gear mechanism including a sun gear, a ring gear, a plurality of planetary pinions, a carrier, a clutch for selectively rotationally coupling said carrier to said sun gear, and a brake for selectively preventing said sun gear from rotating, said ring gear being rotationally connected with said through lay shaft, while said carrier is rotationally connected with said power output gear wheel, the connection between said ring gear and said through lay shaft and the connection between said carrier and said power output gear shaft being positioned on the same axial side of said second gear transmission mechanism opposite to the other axial side thereof where said second gear wheel is positioned.

3. An automatic transmission for an automotive vehicle according to claim 2, wherein said clutch and said brake are positioned between the meshing assembly of said sun gear, said ring gear, and said planetary pinions and said second gear wheel.

4. An automatic transmission for an automotive vehicle according to claim 2, wherein said first gear wheel is constructed as a helically cut gear having a certain handedness, said second gear wheel is constructed as a helically cut gear wheel having the opposite handedness to said certain handedness, and said power output gear wheel is constructed as a helically cut gear wheel having said certain handedness and is axially coupled to said through lay shaft in a force transmitting relationship.

5. An automatic transmission for an automotive vehicle according to claim 4, wherein said sun gear is constructed as a helically cut gear having said certain handedness, said planetary pinions are constructed as helically cut gear wheels having the opposite handedness to said certain handedness, and said ring gear is constructed as a helically cut gear having the opposite handedness to said certain handedness, and further comprising a bearing means for sustaining axial force between said sun gear and said ring gear while allowing relative rotational motion therebetween when said sun gear is urged in the direction towards said power output gear wheel relative to said ring gear and said ring gear is urged in the direction towards said second gear wheel relative to said sun gear, a bearings mens for preventing said sun gear from moving in the axial direction towards said second gear wheel while allowing relative rotational motion therebetween when said sun gear is urged in the axial direction towards said second gear wheel, and a means for sustaining axial force between said ring gear and said power output gear wheel while allowing relative rotational motion therebetween when said ring gear is urged in the axial direction towards said power output gear wheel.

* * * * *